US007834595B2

(12) United States Patent
Yasuhito et al.

(10) Patent No.: US 7,834,595 B2
(45) Date of Patent: Nov. 16, 2010

(54) MULTI BATTERY PACK SYSTEM, CONTROL METHOD THEREOF, AND BATTERY PACK USING THE SAME (75) Inventors: Eguchi Yasuhito, Daejeon (KR); Tanina Shoji, Tokyo (JP); Dal-Hoon Lee, Daejeon (KR); Sang-Hoon Lee, Daejeon (KR); Jee-Ho Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/796,043

(22) Filed: Jun. 8, 2010

(65) Prior Publication Data
US 2010/0244770 A1 Sep. 30, 2010

Related U.S. Application Data (62) Division of application No. 11/611,595, filed on Dec. 15, 2006, now Pat. No. 7,759,904.

(30) Foreign Application Priority Data
Dec. 15, 2005 (KR) ...................... 10-2005-0123674

(51) Int. Cl.
*H02J 7/24* (2006.01)
(52) U.S. Cl. .................. 320/162; 320/127; 320/124; 320/156
(58) Field of Classification Search ............. 320/127, 320/124, 125, 137, 164, 163, 162, 161, 156, 320/157, 155, 148, 146
See application file for complete search history.

(56) References Cited

U.S. PATENT DOCUMENTS 5,644,209 A 7/1997 Chabbert et al.
(Continued)

FOREIGN PATENT DOCUMENTS

EP 0851556 A2 7/1998
(Continued)

OTHER PUBLICATIONS

Dynamic Equalization During Charging of Serial Energy Storage Elements; Douglas C. Hopkins, Charles R. Mosling, Steven T. Hung; IEE Transaction on Industry Applications 29 (1993) Mar./Apr, No. 2, New York, US.

*Primary Examiner*—Edward Tso
*Assistant Examiner*—Alexis Boateng
(74) *Attorney, Agent, or Firm*—Cantor Colburn LLP (57) ABSTRACT A multi battery pack system is composed of a plurality of battery packs. The master battery pack receives a total voltage from each slave battery pack and calculates a target total voltage using its total voltage and total voltages of all slave battery pack whenever a predetermined time period passes, sends the calculated target total voltage to each slave battery pack, compares the target total voltage with its total voltage, and then connects or disconnects its cell group and output terminals according to the comparison result. The slave battery packs include at least one slave battery pack, which sends its total voltage according to a request of the master battery pack, receives a target total voltage from the master battery pack, compares the target total voltage with its total voltage, and then connects or disconnects its cell group and output terminals according to the comparison result.

6 Claims, 7 Drawing Sheets

U.S. PATENT DOCUMENTS

| | | | |
|---|---|---|---|
| 6,194,871 B1 * | 2/2001 | Haraguchi et al. | 320/134 |
| 6,291,972 B1 * | 9/2001 | Zhang | 320/118 |
| 7,019,488 B2 * | 3/2006 | Nakao | 320/104 |
| 2002/0000788 A1 * | 1/2002 | Ostergaard et al. | 320/128 |
| 2005/0077874 A1 | 4/2005 | Nakao | |
| 2005/0266300 A1 * | 12/2005 | Lamoreux et al. | 429/50 |
| 2006/0167569 A1 * | 7/2006 | Colombi et al. | 700/22 |

FOREIGN PATENT DOCUMENTS

| | | |
|---|---|---|
| JP | 10321535 A | 12/1998 |
| JP | 2006187397 A | 7/2006 |

\* cited by examiner

MULTI BATTERY PACK SYSTEM, CONTROL METHOD THEREOF, AND BATTERY PACK USING THE SAME

CROSS REFERENCE TO RELATED APPLICATIONS

This application is a Divisional application of U.S. application Ser. No. 11/611,595 filed Dec. 15, 2006, which claims priority to Korean Patent Application No. 10-2005-0123674 filed on Dec. 15, 2005, the content of which in its entirety is herein incorporated by reference.

BACKGROUND OF THE INVENTION

1. Field of the Invention

The present invention relates to a battery pack, and more particularly to a multi battery pack system composed of a plurality of battery packs, its control method, and a battery pack using the same.

2. Description of the Related Art

Generally, a portable electronic device such as a cellular phone, notebook or digital camera employs a battery pack including a plurality of chargeable cells as a power source.

In recent years, a multi battery pack system having a plurality of battery packs connected in parallel has been proposed, which provides so sufficient capacity to ensure stable operation of the portable electronic device and allows application to various kinds of portable electronic devices.

However, the multi battery pack system has a problem of difficult control since it is configured so that the number of battery packs included therein is changeable.

In order to solve the problem, various schemes have been proposed. For example, Japanese Patent No. 3405526 discloses a multi battery pack power unit. In the multi battery pack power unit, each of the multiple battery packs include a plurality of cells and a circuit for detecting a charging/discharging state and controlling the charging/discharging, wherein one battery pack is set as a master battery pack and the other are set as slave battery packs. The master battery pack requests transmission of data indicating the charging/discharging state to the slave battery packs by means of communication, manages whole data, determines the charging/discharging state, sends a command, and controls the charging/discharging. On the while, the slave battery packs send data indicating the charging/discharging state according to the data request, receive the command, and conduct the charging/discharging.

According to the above document, the master battery pack controls charging/discharging of the plurality of slave battery packs. Thus, as the number of slave battery packs is increased, more loads are applied to the battery pack set as a master.

Accordingly, there is an urgent need for a multi battery pack system, which is capable of allowing control of numerous slave battery packs without increasing loads on a master battery pack.

SUMMARY OF THE INVENTION

The present invention is designed to solve the problems of the prior art, and therefore it is an object of the present invention to provide a multi battery pack capable of allowing control of numerous slave battery packs without increasing loads on a master battery pack of the multi battery pack system, its control method, and a battery pack using the same.

In order to accomplish the above object, the present invention provides a multi battery pack system including a master battery pack that receives a total voltage from each slave battery pack and calculates a target total voltage using a total voltage of the master battery pack and total voltages of all slave battery pack whenever a predetermined time period passes, sends the calculated target total voltage to each slave battery pack, compares the target total voltage with the total voltage of the master battery pack, and then connects or disconnects a cell group of the master battery pack and output terminals according to the comparison result; and at least one slave battery pack that sends a total voltage of the slave battery pack according to a request of the master battery pack, receives a target total voltage from the master battery pack, compares the target total voltage with the total voltage of the slave battery pack, and then connects or disconnects a cell group of the slave battery pack and output terminals according to the comparison result.

In the present invention, the master battery pack of the multi battery pack system receives TTLV (total voltage) of a plurality of slave battery packs whenever a predetermined time period passes, calculates TGTTLV (target total voltage) according to a charging or discharging mode, and sends the TGTTLV to the plurality of slave battery packs, while the plurality of slave battery packs receiving the TGTTLV connects a plurality of cells and output terminals for charging or discharging based on the TTLV and the TGTTLV by themselves.

As mentioned above, the present invention allows control of a plurality of battery packs provided to a multi battery pack system just by providing the TGTTLV to the plurality of slave battery packs, thereby not applying loads on the master battery pack though the number of slave battery packs is increased.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
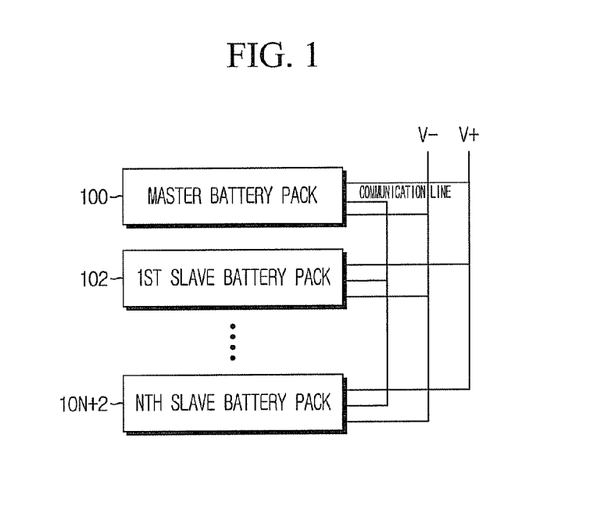
FIG. 1 is a schematic diagram showing a multi battery pack system according to a preferred embodiment of the present invention.

FIG. 1 shows a multi battery pack system according to a preferred embodiment of the present invention.

Referring to FIG. 1, the multi battery pack system includes a master battery pack 100 and $1^{st}$ to $N^{th}$ slave battery packs 102~10N+2.

The master battery pack 100 and the $1^{st}$ to $N^{th}$ slave battery packs 102~10N+2 are connected to power output terminals V+, V− in parallel, and output predetermined power to the power output terminals V+, V−.

The master battery pack 100 requests a total voltage (TTLV) to the $1^{st}$ to $N^{th}$ slave battery packs 102~10N+2 whenever a predetermined time period passes. Then, if the $1^{st}$ to $N^{th}$ slave battery packs 102~10N+2 provides TTLV according to the request, the master battery pack 100 calculates a target total voltage (TGTTLV) based on its own TTLV and a TTLV of the $1^{st}$ to $N^{th}$ slave battery packs 102~10N+2, and sends the TGTTLV to the $1^{st}$ to $N^{th}$ slave battery packs 102~10N+2.

After that, the master battery pack 100 compares the TGTTLV with its own TTLV, and then connects or disconnects a cell group and an output terminal according to the comparison result. In particular, the master battery pack 100 selectively controls a switching element of a switching unit according to a charging or discharging mode.

In addition, if the TGTTLV is provided from the master battery pack 100, the $1^{st}$ to $N^{th}$ slave battery packs 102~10N+2 compare the TGTTLV with their own TTLV, and then connect or disconnect the cell group and the output terminal according to the comparison result. In particular, the $1^{st}$ to $N^{th}$ slave battery packs 102~10N+2 selectively control a switching element of a switching unit according to the charging or discharging mode.

Here, when the switching units of the master battery pack 100 and the $1^{st}$ to $N^{th}$ slave battery packs 102~10N+2 connect the cell group with the output terminals V+, V−, each battery pack is connected in parallel based on the output terminals V+, V−.

The master battery pack 100 and the $1^{st}$ to $N^{th}$ slave battery packs 102~10N+2 have the same configuration but they are different just in their operations as a master or a slave, so only one battery pack will be described in detail below with reference to FIG. 2.

Figure 2:
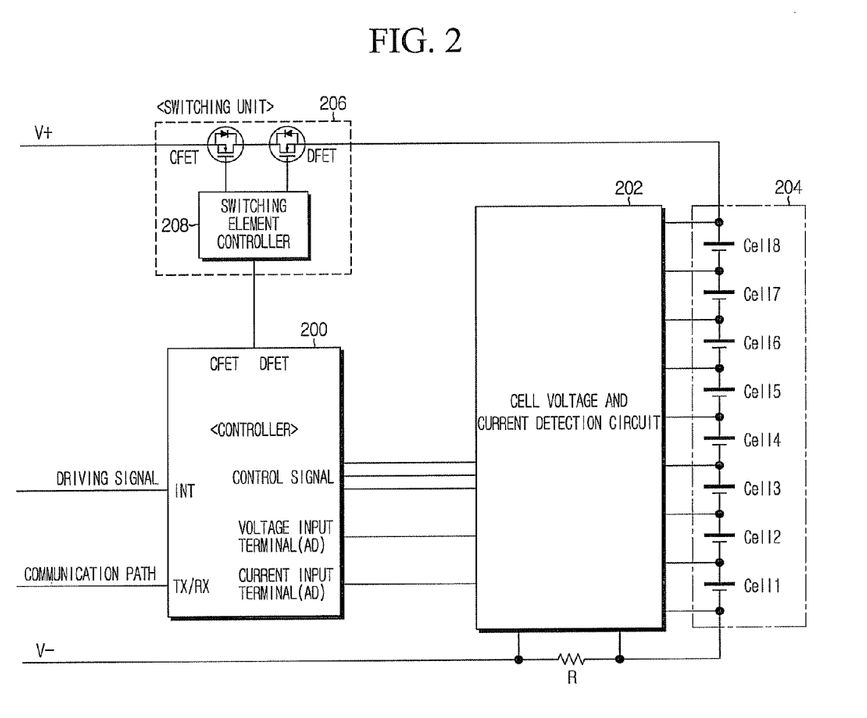
FIG. 2 is a circuitry diagram showing a battery pack according to a preferred embodiment of the present invention.

Referring to FIG. 2, when being set as a master, a controller 200 of the battery pack receives TTLV from the $1^{st}$ to $N^{th}$ slave battery packs 102~10N+2, and receives its own TTLV from a cell voltage and current detection circuit 202. Then, the controller 200 calculates TGTTLV of the entire battery packs and sends the calculated TGTTLV to the $1^{st}$ to $N^{th}$ slave battery packs 102~10N+2, together with controlling a switching unit 206 according to the TGTTLV.

In particular, the controller 200 set as a master calculates TGTTLV of the entire battery pack based on a minimum voltage of the entire battery packs in case of a charging mode, while it calculate TGTTLV of the entire battery packs based on a maximum voltage of the entire battery packs in case of a discharging mode. Here, the TGTTLV of the charging mode or the discharging mode is determined in consideration of a maximum load current, a switching current capacity of each pack, a pack temperature, a current flow, TTLV of each pack, an internal resistance of the battery, and characteristics of the battery.

In addition, when being set as a slave, the controller 200 sends its own TTLV according to the request of the master battery pack 100, and controls the switching unit 206 according to the TGTTLV provided from the master battery pack 100.

Also, the controller 200 is operated using a driving signal, and it is connected with another battery pack via a communication path to conduct serial communication conforming to RS 232.

Figure 5:
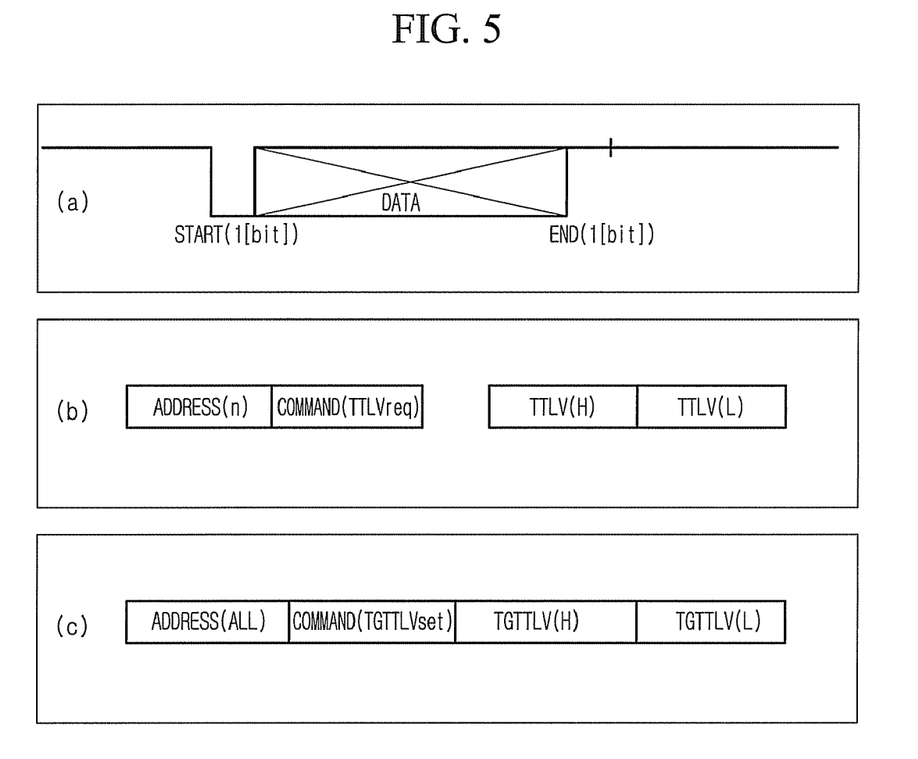
FIG. 5 is a schematic view showing a data format according to a preferred embodiment of the present invention.

The communication format employed in the present invention is composed of 1 bit for start, 8 bits for data, and 1 bit for end, with a communication rate of 9600 [bps], as shown in (a) of FIG. 5. Here, though the preferred embodiment of the present invention just exemplifies serial communication conforming to RS 232, it is apparent to those having ordinary skill in the art that various communication methods such as ITC may be employed.

The controller 200 may carry a TTLV request message, composed of an address and a command of the slave battery pack, on a data region of the communication format and then send it to any one slave battery pack, or it may carry a TTLV response message, composed of its own maximum and minimum voltages, to the master battery pack 100 according to the TTLV request message, as shown in (b) of FIG. 5.

In addition, as shown in (c) of FIG. 5, the controller 200 may send a TGTTLV informing message composed of a command and an address indicating all of the $1^{st}$ to $N^{th}$ slave battery packs 102~10N+2, and maximum and minimum voltages of TGTTLV.

Meanwhile, the controller 200 receives a detected voltage of each of the plurality of cells Cell1~Cell8 included in a cell group 204 from the cell voltage and current detection circuit 202, and then adds the detected voltages to calculate its own TTLV.

In addition, in case the TTLV of the controller 200 is different from TGTTLV, the controller 200 controls the switching unit 206 to connect both ends of the cell group 204, in which the plurality of cells Cell1~Cell8 are connected in series, to the output terminals V+, V−.

The switching unit 206 is composed of a charging switching element (CFET) and a discharging switching element (DFET) connected in series between the cell group 204 and the output terminal V+, and a switching element controller 208. The switching element controller 208 controls the CFET and the DFET under the control of the controller 200. That is to say, the switching element controller 208 turns on the CFET in case of a charging mode, and turns on the DFET in case of a discharging mode. The switching unit 206 configured as mentioned above is well known in the battery pack field, already disclosed in Japanese Patent Publication H10-321535, and not described in detail here.

The cell voltage and current detection circuit 212 detects voltage and current of each of the plurality of cells Cell1~Cell8 and inputs the voltage and current to AD terminals of the controller 200. In particular, a current sensing resistance R is connected in series between the cell group 204 and the output terminal V−, and the cell voltage and current detection circuit 202 senses a current using voltages at both ends of the current sensing resistance R.

The cell group 204 is composed of a plurality of chargeable cells Cell1~Cell8 connected in series.

Now, the operation of the multi battery pack according to a preferred embodiment of the present invention will be described in more detail with reference to a flowchart.

Figure 3:
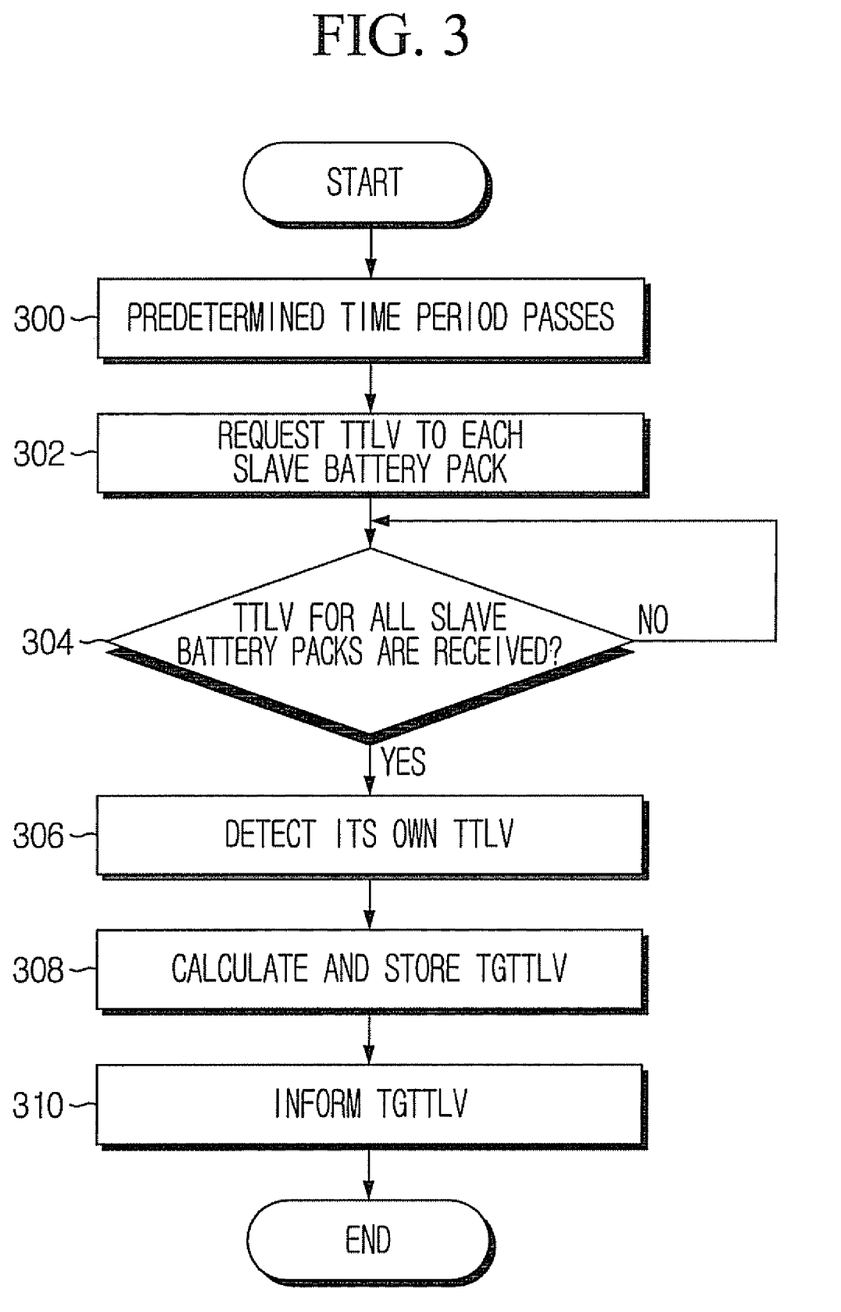
FIG. 3 is a flowchart illustrating the process of controlling a master battery pack according to a preferred embodiment of the present invention.

FIG. 3 is a flowchart illustrating the process of calculating TGTTLV conducted by the master battery pack according to a preferred embodiment of the present invention.

Referring to FIG. 3, the controller of the master battery pack 100 checks whether a predetermined time period passes, by using an internal timer (not shown) (Step 300). Here, the predetermined time period may be determined several ten milliseconds or several seconds. Whenever the predetermined time period passes, the controller of the master battery pack 100 sends a TTLV request message to each of the $1^{st}$ to $N^{th}$ slave battery packs 102~10N+2 connected thereto through a communication path (Step 302).

If the $1^{st}$ to $N^{th}$ slave battery packs 102~10N+2 sends a TTLV response message according to the TTLV request message (YES of Step 304), the controller of the master battery pack 100 detects its own TTLV through its own cell voltage and current detection circuit (Step 306). Thus, the controller obtains TTLV of all of the battery packs 100, 102~10N+2, and calculates TGTTLV using the TTLV of all of the battery packs 100, 102~10N+2 (Step 308). In particular, the controller calculates TGTTLV of all battery packs based on a minimum voltage of all battery packs in case of the charging mode, and calculates TGTTLV of all battery packs based on a maximum voltage of all battery packs in case of the discharging mode. Then, the controller stores the TGTTLV into a memory (not shown).

If the TGTTLV is calculated, the controller of the master battery pack 100 configures the TGTTLV into a TGTTLV informing message, and then sends the TGTTLV informing message to the $1^{st}$ to $N^{th}$ slave battery packs 102~10N+2 (Step 310).

Figure 4:
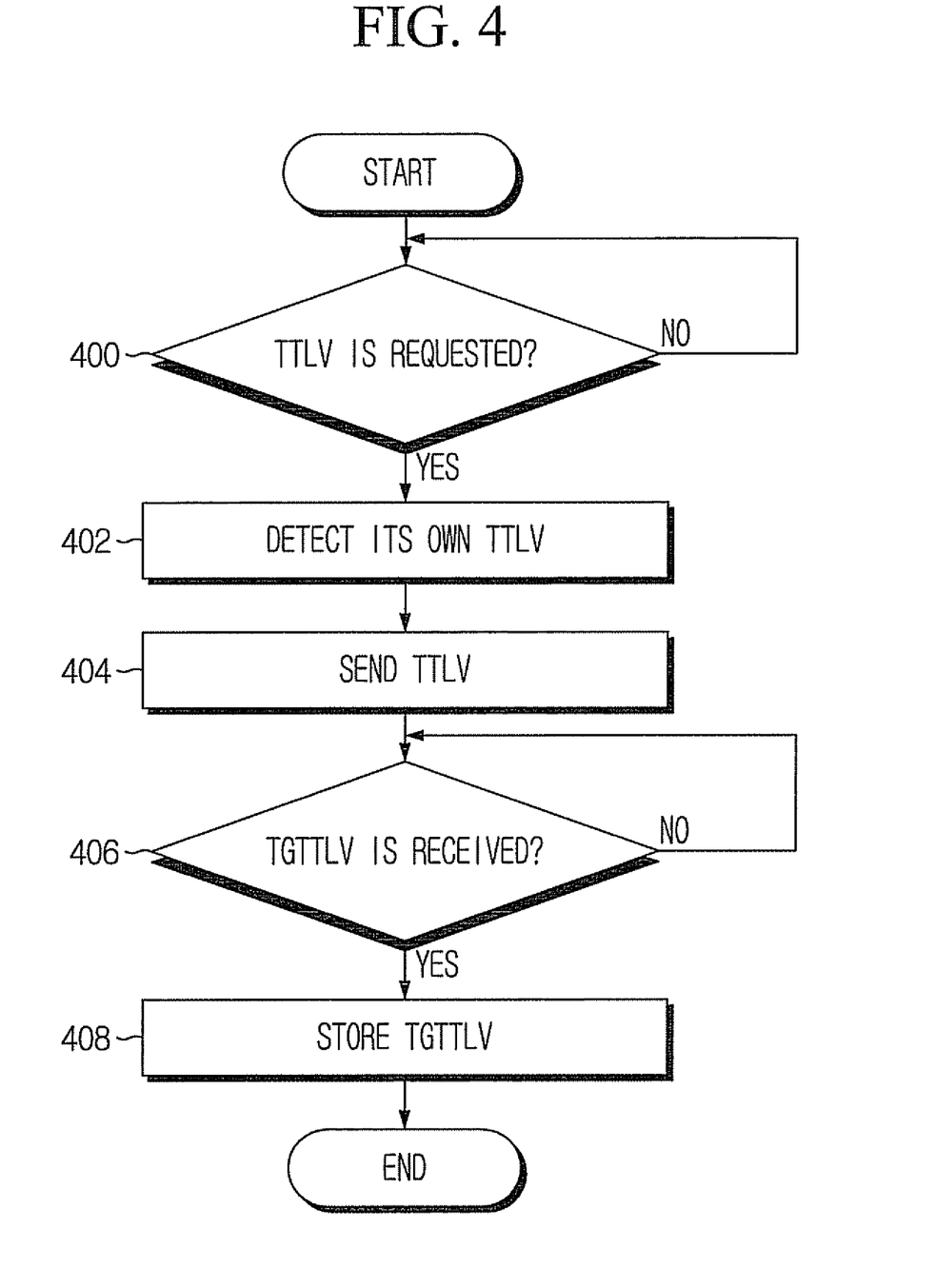
FIG. 4 is a flowchart illustrating the process of controlling a slave battery pack according to a preferred embodiment of the present invention.

FIG. 4 is a flowchart illustrating that the slave battery pack sends its own TTLV in communication with the master battery pack, and receives and stores TGTTLV. Here the $1^{st}$ to $N^{th}$ slave battery packs 102~10N+2 are processed in an identical way, so only one slave battery pack will be explained.

Referring to FIG. 4, if a TTLV request message is received from the master battery pack 100 (YES of Step 400), the controller of the slave battery pack detects its own TTLV using the cell voltage and current detection circuit (Step 402), and then configures the detected TTLV into a TTLV response message and sends the TTLV response message to the master battery pack 100 (Step 404).

After that, if a TGTTLV message is received from the master battery pack 100 (YES of Step 406), the controller of the slave battery pack stores the received TGTTLV in a memory (not shown) (Step 408).

According to FIGS. 3 and 4, the master battery pack determines TGTTLV based of TTLV of all battery packs 100, 102~10N+2 whenever a predetermined time period passes. Thus, if the TTLV for all battery packs 100, 102~10N+2 is changed according to charging or discharging, the TGTTLV is also changed. Accordingly, any slave battery pack having TTLV not corresponding to the TGTTLV becomes corresponded to the TGTTLV.

Now, the operation of the battery pack according to the TGTTLV will be explained with reference to the drawings.

Figure 6:
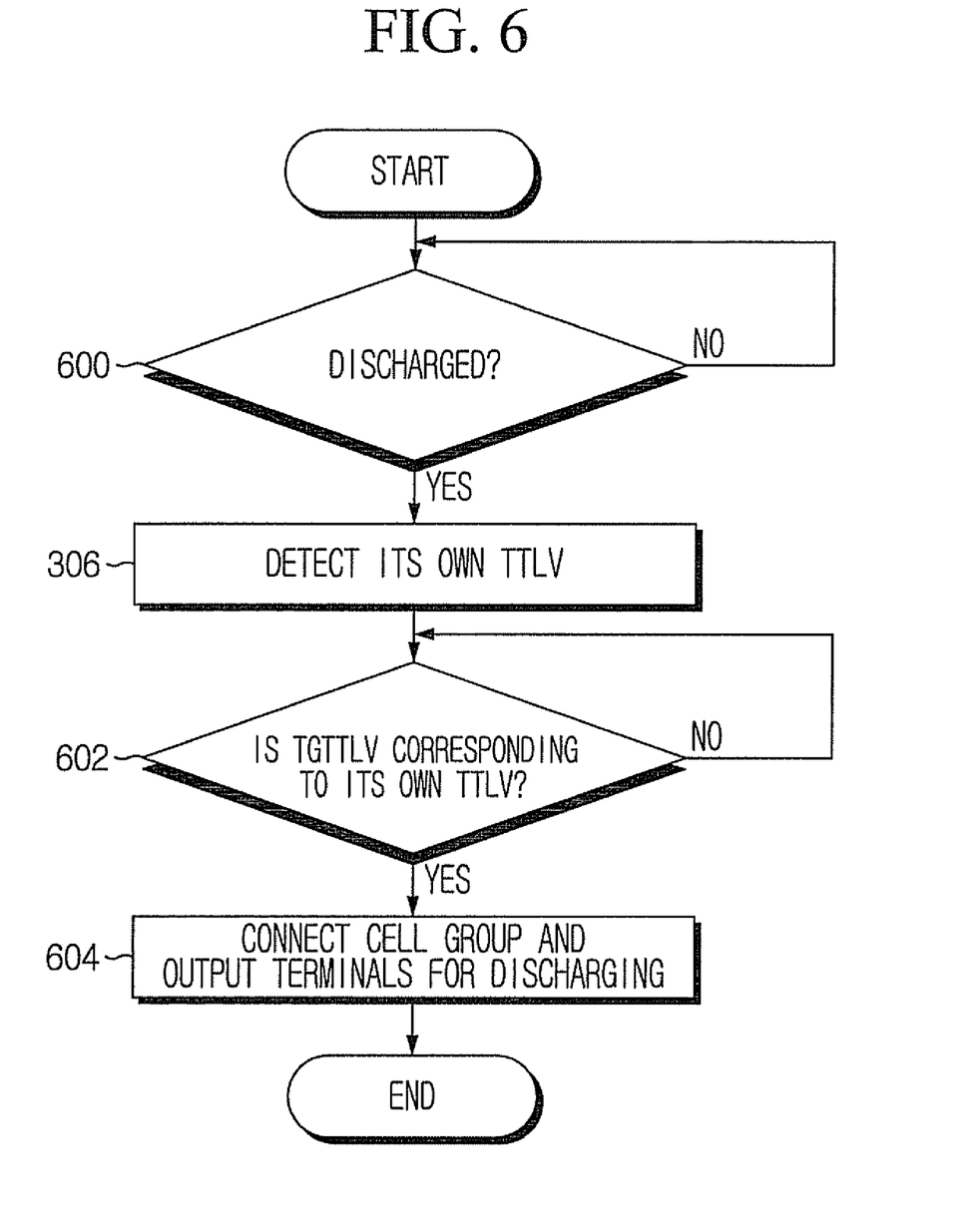
FIG. 6 is a flowchart illustrating a discharging method according to a preferred embodiment of the present invention.

First, the operation in the discharging mode is described with reference to the flowchart of FIG. 6.

In case of the discharging mode (YES of Step 600), the controller of the master or slave battery pack detects its own TTLV using the cell voltage and current detection circuit (Step 306), and then compares the detected TTLV with a previously stored TGTTLV to check whether both voltages are corresponding to each other (Step 602). Here, both voltages are corresponded to each other when the TTLV is equal to or greater than the TGTTLV.

If the detected TTLV is corresponded to the previously stored TGTTLV (YES of Step 602), the controller of the master or slave battery pack controls the switching unit to connect the output terminals V+, V– and the cell group (Step 604). Thus, the charging voltage of cells in the cell group is discharged through the output terminals V+, V–.

Figure 7:
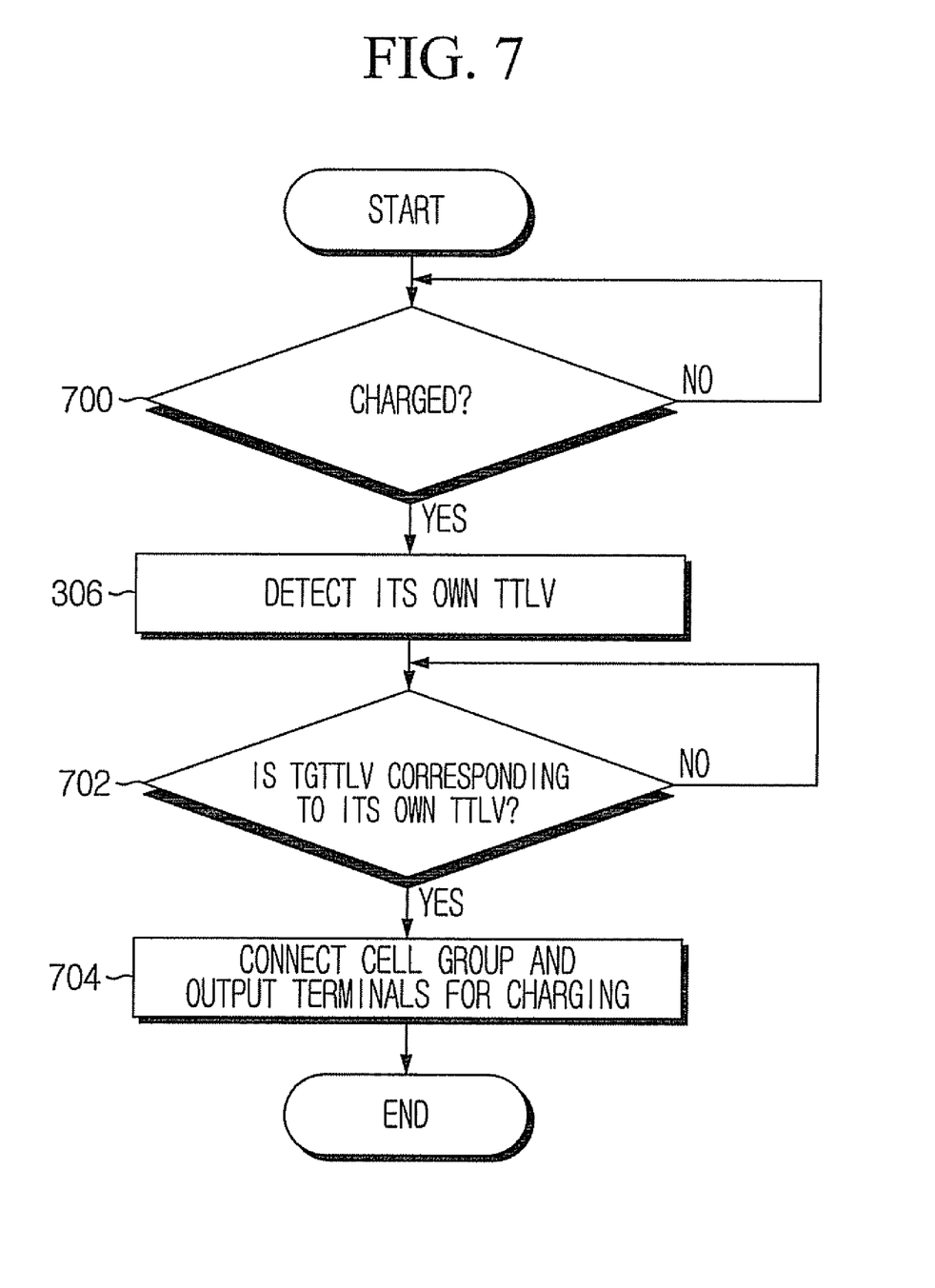
FIG. 7 is a flowchart illustrating a charging method according to a preferred embodiment of the present invention.

Now, the operation in the charging mode is described with reference of the flowchart of FIG. 7.

In case of the charging mode (YES of Step 700), the controller of the master or slave battery pack detects its own TTLV using the cell voltage and current detection circuit (Step 306), and then compares the detected TTLV with a previously stored TGTTLV to check whether both voltages are corresponded to each other (Step 702). Here, both voltages are corresponded to each other when the TTLV is smaller than or equal to the TGTTLV.

If the detected TTLV is corresponded to the previously stored TGTTLV (YES of Step 702), the controller of the master or slave battery pack controls the switching unit to connect the output terminals V+, V– and the cell group (Step 704). Thus, cells in the cell group are discharged according to the power input through the output terminals V+, V–.

Now, the operation of the battery pack according to a preferred embodiment of the present invention will be explained again with reference to FIG. 8.

Figure 8:
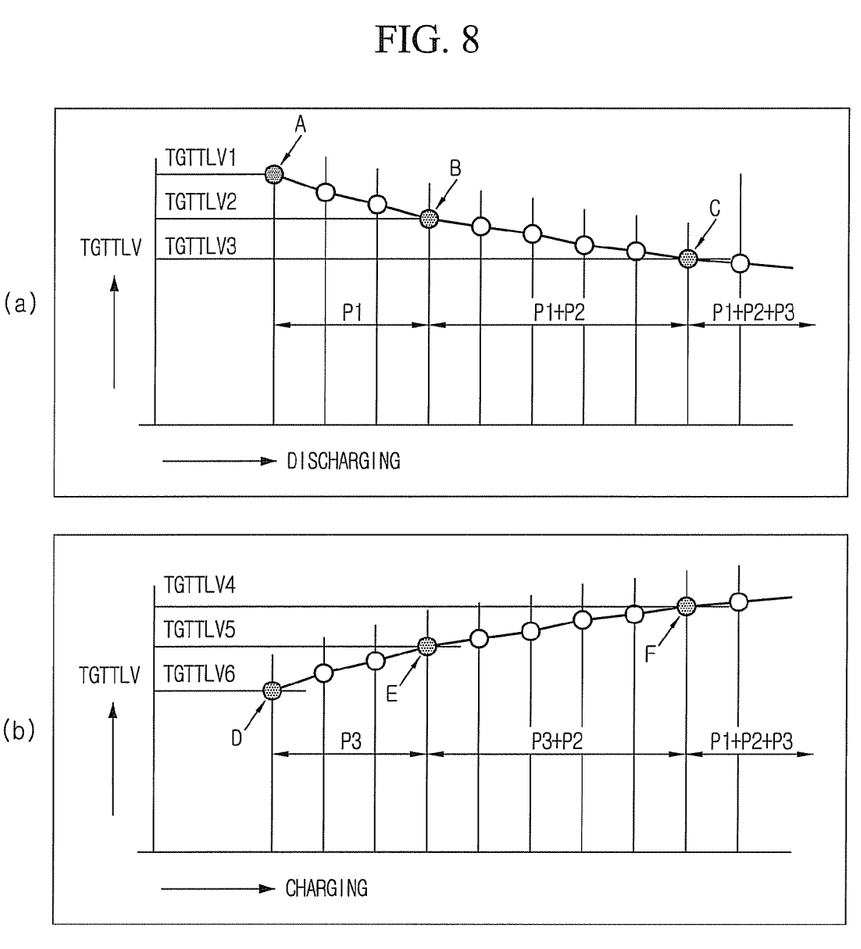
FIG. 8 is a graph showing a waveform of a target total voltage (TGTTLV) according to a preferred embodiment of the present invention.

The master battery pack 100 determines TGTTLV based on TTLV of all battery packs 100, 102~10N+2 whenever a predetermined time period passes, so TGTTLV is also changed according to charging or discharging. Since the TGTTLV is changed according to charging or discharging, slave battery packs connected in parallel for charging or discharging are also changed.

Seeing the discharging mode in more detail with reference to (a) of FIG. 8, a discharging process is conducted while only a predetermined battery, pack A corresponding to an initial target total voltage TGTTLV1 is connected to the output terminals, so TTLV for the predetermined battery pack A is dropped.

In linkage with the voltage drop of the predetermined battery pack A, an average of TTLV for all battery packs 100, 102~10N+2 is also dropped, and accordingly the target total voltage calculated based on the TTLV for all battery packs 100, 102~10N+2 is also dropped (TGTTLV1→TGTTLV2). For example, if an average of TTLV of all battery packs 100, 102~10N+2 obtained at a certain time point is decreased lower than an average of TTLV calculated at a former time point by more than a given criterion value, the TTLV is dropped to a level between the average of TTLV calculated at the current time point and the maximum TTLV. However, the present invention is not limited thereto. Thus, it would be apparent to those having ordinary skill in the art that various modifications are possible, for example a TGTTLV level may be periodically decreased with setting a dropping level of TTLV in advance.

As the TGTTLV is dropped, a battery pack B having a lower TTLV than the predetermined battery pack A is connected to the output terminals in parallel. Accordingly, the battery packs A and B are discharged at the same time. In addition, if the TGTTLV is lowered again from TGTTLV2 to TGTTLV3 as time goes, the battery packs A, B and C are actively connected to the output terminals and then discharged at the same time.

As mentioned above, in the present invention, TGTTLV is changeable according to a voltage change caused by discharging, each of the plurality of battery packs checks its connecting ability by itself according to the change of TGT-TLV, and it makes a connection to the output terminals according to the results.

Seeing the charging mode in more detail with reference to (b) of FIG. 8, a charging process is conducted while only a predetermined battery pack D corresponding to an initial target total voltage TGTTLV6 is connected to the output terminals, so TTLV for the predetermined battery pack D is increased.

In linkage with the TTLV increase of the predetermined battery pack D, an average of TTLV for all battery packs 100, 102~10N+2 is also increased, and accordingly the target total voltage calculated based on the TTLV for all battery packs 100, 102~10N+2 is also increased (TGTTLV6→TGTTLV5). For example, if an average of TTLV of all battery packs 100, 102~10N+2 obtained at a certain time point is increased higher than an average of TTLV calculated at a former time point by more than a given criterion value, the TTLV is increased to a level between the minimum TTLV and the average of TTLV calculated at the current time point. However, the present invention is not limited thereto. Thus, it would be apparent to those having ordinary skill in the art that various modifications are possible, for example a TGTTLV level may be periodically increased with setting an increase level of TTLV in advance.

As the TGTTLV is increased as mentioned above, a battery pack E having a higher TTLV than the predetermined battery pack D is also connected to the output terminals in parallel. Accordingly, the battery packs D and E are discharged at the same time. In addition, if the TGTTLV is increased again from TGTTLV5 to TGTTLV4 as time goes, the battery packs D, E and F are actively connected to the output terminals and then discharged at the same time.

As mentioned above, in the present invention, TGTTLV is changeable according to a voltage change caused by charging, each of the plurality of battery packs checks its connecting ability by itself according to the change of TGTTLV, and it makes a connection to the output terminals according to the results.

The embodiment of the present invention described above also includes a computer-readable medium including program commands for executing the operations realized by various computers. The computer-readable medium may include program commands, data files, data structures and so on, in single or in combination. The program commands of the medium may be specially designed for the present invention, or well known in the art and available from the market.

APPLICABILITY TO THE INDUSTRY

In one aspect of the present invention, the multi battery pack system of the present invention may control numerous slave battery packs without increasing loads on a master battery pack.

In another aspect of the present invention, the master battery pack does not directly control slave battery packs, thereby ensuring easy mounting and detaching of the slave battery packs.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed:

1. A control method for a master battery pack capable of communicating with at least one slave battery pack, the control method comprising:
   receiving a total voltage of a battery from each slave battery pack whenever a predetermined time period passes, and sensing a total voltage of the master battery pack;
   calculating a target total voltage using the received total voltage of each slave battery slave pack and the sensed total voltage of the master battery pack; and
   sending the calculated target total voltage to each slave battery pack, comparing the target total voltage with the total voltage of the master battery pack, and then connecting or disconnecting a cell group thereof and output terminals according to the comparison result.

2. The control method for a master battery pack according to claim 1
   wherein, in case of a charging mode, the target total voltage is calculated as a target total voltage for all battery packs based on a minimum voltage for all battery packs, and
   wherein, in case of a discharging mode, the target total voltage is calculated as a target total voltage for all battery packs based on a maximum voltage for all battery packs.

3. The control method for a master battery pack according to claim 2
   wherein, in the charging mode, the target total voltage is increased step by step as time goes, and
   wherein, in the discharging mode, the target total voltage is dropped step by step as time goes.

4. A control method for a slave battery pack in a multi battery pack system including a plurality of slave battery packs connected and communicated with a master battery pack that calculates a target total voltage using a total voltage of all battery packs, the control method comprising:
   sensing a total voltage according to a request of the master battery pack and sending the total voltage to the master battery pack whenever a predetermined time period passes;
   receiving the target total voltage from the master battery pack; and
   comparing the target total voltage with a total voltage of the slave battery pack, and connecting or disconnecting a cell group thereof and output terminals according to the comparison result.

5. The control method for a slave battery pack according to claim 4,
   wherein, in case of a charging mode, the target total voltage is calculated as a target total voltage for all battery packs based on a minimum voltage for all battery packs, and
   wherein, in case of a discharging mode, the target total voltage is calculated as a target total voltage for all battery packs based on a maximum voltage for all battery packs.

6. The control method for a slave battery pack according to claim 5,
   wherein, in the charging mode, the target total voltage is increased step by step as time goes, and
   wherein, in the discharging mode, the target total voltage is dropped step by step as time goes.

* * * * *